Oct. 31, 1967  J. FIRTH  3,350,617
POSITIONING DEVICE FOR USE ON MACHINE TOOLS
Filed Feb. 8, 1965  2 Sheets-Sheet 1

Inventor
JOHN FIRTH
By Irwin S. Thompson
Attorney

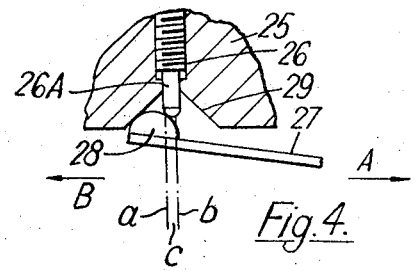
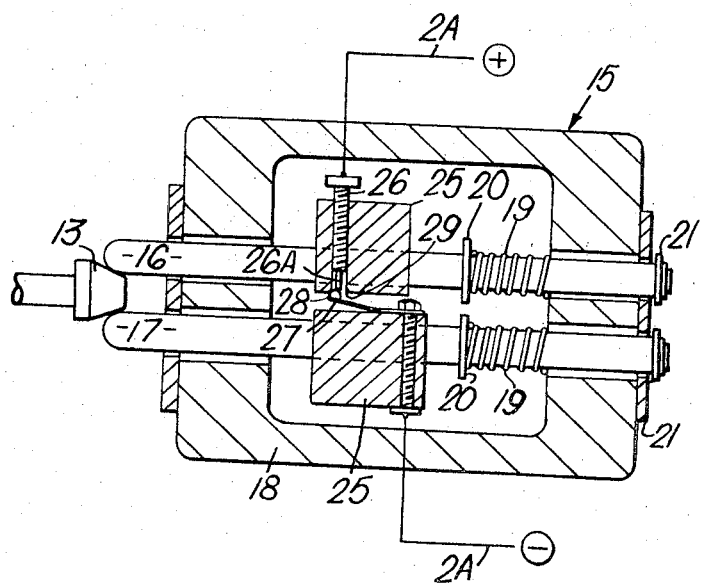

United States Patent Office 3,350,617
Patented Oct. 31, 1967

3,350,617
POSITIONING DEVICE FOR USE ON
MACHINE TOOLS
John Firth, Arbroath, Angus, Scotland, assignor to
Giddings & Lewis-Fraser Limited, Angus, Scotland
Filed Feb. 8, 1965, Ser. No. 431,064
Claims priority, application Great Britain, Feb. 22, 1964,
7,489/64
3 Claims. (Cl. 318—468)

ABSTRACT OF THE DISCLOSURE

A stop-motion switch in a machine tool has two side-by-side plungers depressible independently and together by a projection secured to the worktable. Each plunger carries one of two switch contacts arranged to break contact when the plungers are depressed one relative to the other by more than a predetermined amount, the final signal to stop motion being given by the contacts making contact when the plungers have been depressed successively by the projection.

---

This invention relates to a machine tool having a base, a worktable on the base and movable relative thereto in opposite directions, and a device for enabling the worktable to be stopped at a predetermined position on the base.

According to the present invention, there is provided in a machine tool including a base, a worktable on the base and movable relative thereto in opposite directions, worktable motion-controlling means operatively connected to the worktable for driving and stopping the worktable, and an electric circuit including control means connected to the worktable motion-controlling means and capable of being actuated selectively in accordance with a change in the state of the electric circuit; a device for enabling the worktable to be stopped at a predetermined position on the base and including first and second members secured one to the base and one to the worktable and mutually engaged when the worktable is at the predetermined position, one of said members comprising a housing, a pair of plungers independently slidably received in the housing and disposed in side-by-side parallel relationship and projecting together from the housing, stops one on each plunger and positioned for engagement simultaneously with a part of the housing when the plungers adopt a predetermined maximum projecting position, spring means urging the plungers independently to their maximum projecting positions, first and second electric contacts carried one by each of the plungers and forming a part of the said electric circuit for effecting a change in the state of the said circuit by making and by breaking mutual contact respectively when the plungers adopt their maximum projecting position and when one of the plungers is depressed relative to the other plunger by more than a predetermined amount, the other of the said members having a projection for engaging the projecting ends of the plungers when the worktable is at the predetermined position, the projecting ends of the plungers being positioned successively in the path of the projection, and cam faces one on the projecting end of each plunger and one on the projection for enabling the plungers to be depressed successively by the projection during movement of the worktable towards the predetermined position.

Figure 1:
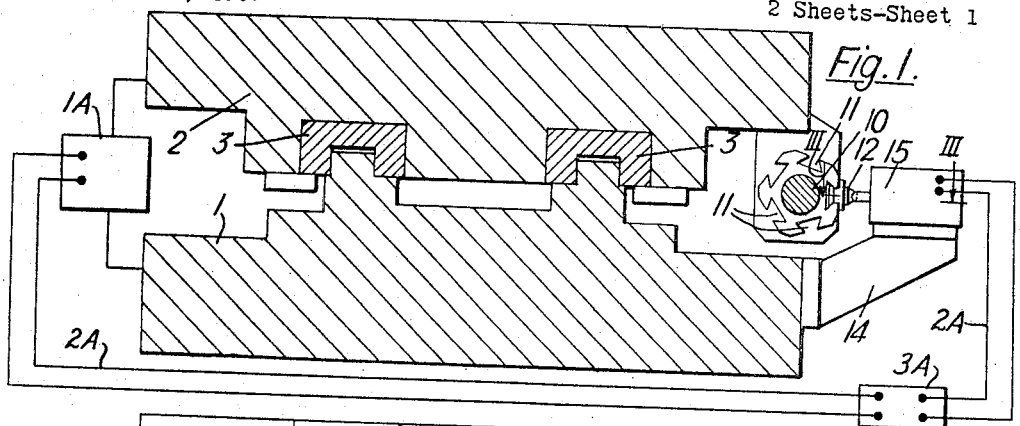
Figure 2:
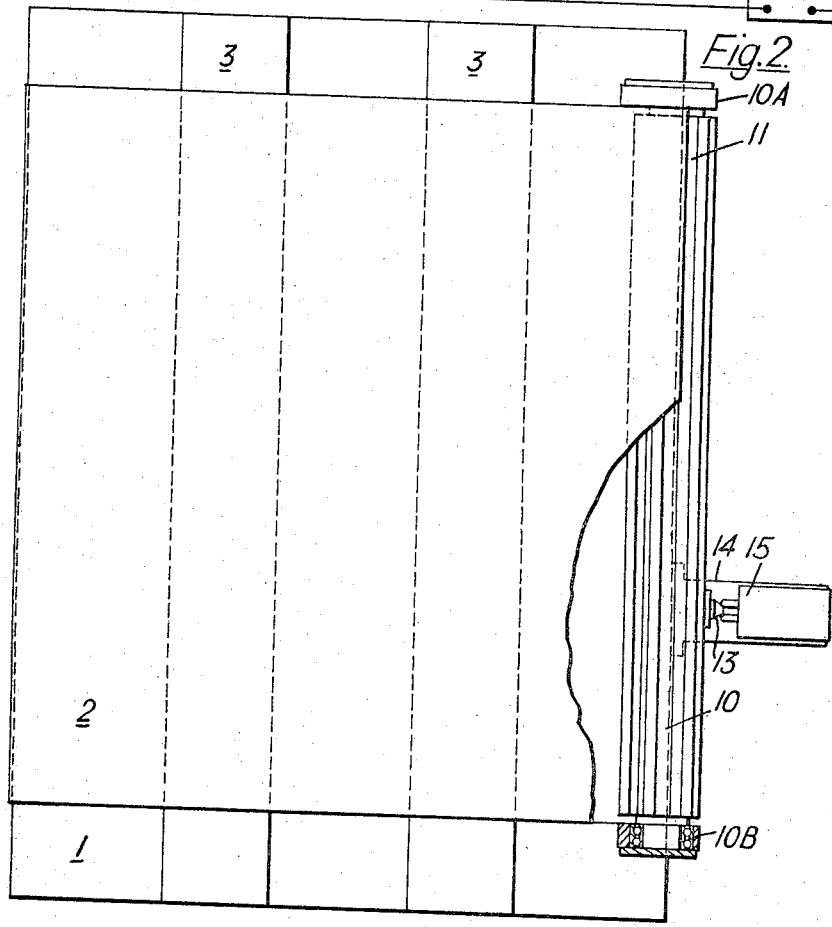

An embodiment of the invention will now be described, by way of example, with reference to the accompanying drawings in which:

FIG. 1 is a sectional side view of part of a machine tool incorporating an example of the present invention, FIG. 2 is a plan view of the machine tool shown in FIG. 1, FIG. 3 is an enlarged plan view taken on the line III—III of FIG. 1, and FIG. 4 is an enlarged view of a detail of FIG. 3.

Referring to the drawings, FIGS. 1 and 2 show part of a machine tool, for example a drilling machine, having a base 1 and a worktable 2 slidable thereon. The table 2 is located by and can slide along parallel guides 3 which are part of base plate 1. Worktable motion-controlling means operatively connected to the worktable for driving and stopping the worktable is shown diagrammatically in FIG. 1 at 1A, and an electric circuit 2A connected to the motion-controlling means 1A includes control means 3A capable of being actuated selectively in accordance with a change in the state of the electric circuit.

The worktable has a shaft 10 rotatably carried thereon on bearings 10A, 10B, and which lies in the direction of travel of the table 2. The shaft 10 has a plurality of dovetail axial slots 11 each of which may locate a first member having a projection in the form of a protruding dog 12. By virtue of the fact that the slots 11 extend axially, the dog 12 can be moved axially with respect to the shaft 10. The protruding end of the dog 12 is a small frustum of a cone 13 which points in a direction normal to the direction of travel of the table 2.

The base 1 has a bracket 14 secured thereto which carries a second member indicated by 15.

Referring to FIG. 3, the second member 15 comprises two parallel rods 16, 17 lying in the same horizontal plane as the dog 12 and normal to the direction of travel of the table 2. The rods 16, 17 are slidably supported in a box housing 18 with their ends protruding therefrom. The rods are urged by compression springs 19 into a position in which, when the dog 12 is placed in line with the rods 16, 17 the adjacent ends of the rods, which are hemispherical, engage the sloping sides of the frustum of the cone 13. The springs 19 act between spring rings 20 and the housing 18, and the ends of the rods remote from the dog have washer stops 21 thereon to limit the movement of each of said rods 16, 17 in the direction of the dog 12.

The rod 16 has secured to it a first electrically insulating block 25 which has, machined in one face a depression in the form of a V groove 29, and a screw 26 having a reduced end 26A fits into block 25, in such a way that the reduced end 26A protrudes into the V groove 29. The center line of the V groove 29 and the screw 26 are substantially in the same plane. Rotation of the screw 26 will cause the reduced end 26A to protrude to a greater or lesser extent into V groove 29, depending on the direction in which screw 26 is rotated. The end 26B of the screw 26 is connected by any convenient method to one side of an electrical supply.

The rod 17 has secured to it a second electrically insulating block 25A which carries a contact arm 27, arranged in such manner, that when rods 16 and 17 are moved relative to each other, the end 28 of contact arm 27 can move into V groove 29 and contact the reduced end 26A of screw 26. The end 28 of contact arm 29 is connected by any convenient means to the other side of the electrical supply.

In operation, when the trip dog 12 causes relative movement between rods 16 and 17, the end 28 of contact arm 27 will approach and move into V groove 29. Continued movement between rods 16 and 17 will cause contact end 28 to touch end 26A of screw 26 causing a part of the electrical circuit 2A to be completed and thus actuating the control means 3A which in turn supplies a signal to the motion-controlling means 1A to stop movement of table 2 on base 1.

When the signal to stop table 2 is given, the table 2 is still moving and some time delay must elapse before movement ceases. This means that if accurate positioning is to be carried out, the signal to stop table 2, must be made before table 2 reaches its required position. One advantage of the arrangement shown in FIG. 3 is that this can be arranged and is illustrated in FIG. 4, which shows an enlarged section of V groove 29, the reduced end 26A of screw 26 and the end 28 of contact arm 29. If the reduced end 26A of screw 26 is adjusted into V groove 29 a distance which allows the contact end 28 to remain in contact with end 26A during some relative movement of rods 16 and 17, it can be seen that, if contact arm 27 is moving in direction of arrow A relative to V groove 29, contact will first be made when end 28 touches end 26A on line $a$. It can also be seen that if contact arm 27 is moving in direction of arrow B, contact end 28 will first contact screw end 26A on line $b$. If the distance between lines $a$ and $b$ is equal to the combined overruns of the table 2, from either direction of movement, after the signal to stop has been given, the table will stop on line $c$, which is the theoretically correct position required.

Other switches, not shown, and of similar design to that shown in FIG. 4, can be used to trigger off speed changes in the rate of table movement so that the table can approach its required position at the maximum speed and be progressively decelerated as it approaches its final position.

I claim:

1. In a machine tool including a base, a worktable on the base and movable relative thereto in opposite directions, worktable motion-controlling means operatively connected to the worktable for driving and stopping the worktable, and an electric circuit including control means connected to the worktable motion-controlling means and capable of being actuated selectively in accordance with a change in the state of the electric circuit; a device for enabling the worktable to be stopped at a predetermined position on the base and including first and second members secured one to the base and one to the worktable and mutually engaged when the worktable is at the predetermined position, one of said members comprising a housing, a pair of plungers independently slidably received in the housing and disposed in side-by-side parallel relationship and projecting together from the housing, stops one on each plunger and positioned for engagement simultaneously with a part of the housing when the plungers adopt a predetermined maximum projecting position, spring means urging the plungers independently to their maximum projecting positions, first and second electric contacts carried one by each of the plungers and forming a part of the said electric circuit for effecting a change in the state of the said circuit by making and by breaking mutual contact respectively when the plungers adopt their maximum projecting position and when one of the plungers is depressed relative to the other plunger by more than a predetermined amount, the other of the said members having a projection for engaging the projecting ends of the plungers when the worktable is at the predetermined position, the projecting ends of the plungers being positioned successively in the path of the projection, and cam faces one on the projecting end of each plunger and one on the projection for enabling the plungers to be depressed successively by the projection during movement of the worktable towards the predetermined position.

2. A device according to claim 1 including first and second blocks of electrically insulating material secured one to each of the said plungers, means defining a depression on the first block and of generally V cross section when viewed in a direction normal to the longitudinal axes of the plungers, a pin inserted through the first block and having an end thereof within the depression and projecting from the bottom of the depression, the said end of the pin defining the first electrical contact, and a spring having the second electrical contact mounted thereon, the spring being carried by the second block and urging the second electrical contact towards the first block and into engagement with the first electrical contact when the plungers are not depressed one relative to the other by more than a predetermined amount and into engagement with a side of the depression when the plungers are depressed one relative to the other by more than a predetermined amount.

3. A device according to claim 2 including adjustable means for permitting the pin to be moved axially relative to the first block whereby the distance between the said end of the pin and the bottom of the depression may be varied.

References Cited

UNITED STATES PATENTS 2,007,180    7/1935    Doran et al.
2,812,671    11/1957    Mottu _____ 77—63 X THOMAS B. HABECKER, *Acting Primary Examiner.*

D. L. TRAFTON, *Assistant Examiner.*